July 30, 1929. G. GODDU ET AL 1,722,287
TACK HANDLING MECHANISM
Original Filed March 28, 1923 2 Sheets-Sheet 1

INVENTORS
George Goddu
Fred L. Mackenzie
By their Attorney
Nelson M. Howard

July 30, 1929.  G. GODDU ET AL  1,722,287
TACK HANDLING MECHANISM
Original Filed March 28, 1923   2 Sheets-Sheet 2

INVENTORS
George Goddu
Fred L. Mackenzie
By their Attorney

Patented July 30, 1929.

BEST AVAILABLE COPY 1,722,287

UNITED STATES PATENT OFFICE.

GEORGE GODDU, OF WINCHESTER, AND FRED L. MACKENZIE, OF BEVERLY, MASSACHUSETTS, ASSIGNORS TO UNITED SHOE MACHINERY CORPORATION, OF PATERSON, NEW JERSEY, A CORPORATION OF NEW JERSEY.

TACK-HANDLING MECHANISM.

Original application filed March 28, 1923, Serial No. 628,234. Divided and this application filed April 1, 1927. Serial No. 180,274.

This invention relates to tack-handling mechanism and is illustrated as embodied in a welt butting and tacking machine for use in the manufacture of boots and shoes, the illustrated machine being of the type disclosed in our application Serial No. 628,234, filed March 28, 1923, of which this application is a division.

Objects of the present invention are generally to improve tack-handling mechanism without sacrificing any of the advantages incident to prior constructions for that purpose, and to produce a mechanism which will be more convenient to use and consume less time of the operator than prior mechanisms.

Features of the invention consist in an organization of tack supplying and handling mechanism by which it may be more easily inspected or taken apart without the use of tools in case it fails to operate satisfactorily by reason of clogging of tacks or in case parts are to be removed or interchanged because of breakage or wear, or in order to effect a change in the kind of tacks being used. The illustrated organization also includes novel tack-separating mechanism arranged to reduce wear and to render adjustment easy and action uniform.

These and other features of the invention, including various novel constructions and arrangements of parts will appear more fully from the following description when read in connection with the accompanying drawings and will be pointed out in the appended claims.

Figure 1:
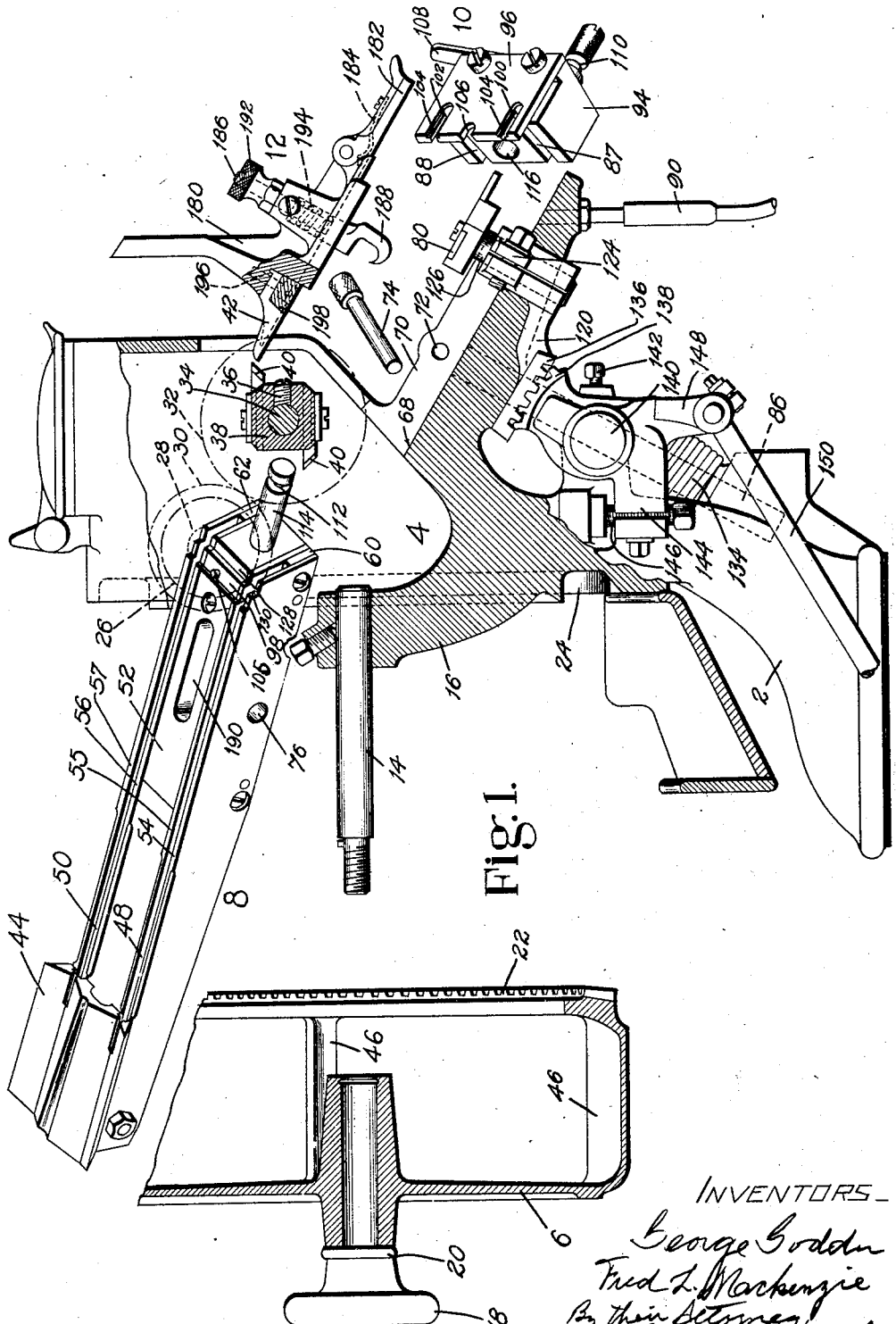
Fig. 1 is an exploded perspective view, partly in section, of the tack-handling mechanism.

As illustrated in the drawings, the mechanism embodying this invention comprises a frame 2 adapted to be secured to a part of the main frame of the machine upon which it is to be used, usually upon the upper portion of the head. The frame 2 is open at the back and is hollowed out to form a chamber 4 to receive the tacks, the tack-clearing mechanism, and the upper portion of the raceway. Associated with the frame are a tack pot 6 and three assemblies or units as follows: a raceway unit 8, a raceway end block unit 10, and a raceway cover unit 12. The open rear end of the chamber 4 is closed by the tack pot 6 which is supported for rotation on a shaft 14 fixedly mounted in a standard 16 projecting from the frame 2. The tack pot is held on the shaft by a thumb nut 18 and washer 20, by removing which the tack pot may be readily removed from the shaft in case it is desired to change the kind of tacks being used by the machine and may either be emptied of the tacks in it or a similar tack pot containing a different size of tacks may be substituted in its place. The front rim of the tack pot is provided at 22 with gear teeth which enter a circular groove 24 in the frame and mesh with the teeth of a pinion 26 mounted on a shaft 28 journaled in the frame, the teeth of the pinion entering the groove.

The shaft 28 which carries the pinion 26 also carries a gear 30 which meshes with a larger gear 32 fixed to a shaft 34 on which is secured at 36 a block 38 which movably supports clearer fingers 40. The fingers cooperate with extensions 42 of the raceway cover unit 12 to clear off the accumulation of tacks on the top of the raceway and assist in filling the raceway channels. The shaft 28 may be continuously driven by a belt running from a pulley member on the machine to which power is applied in any suitable manner to a pulley on the shaft 28. A clutch (not illustrated) may be provided between the pulley and the shaft 28 to drive or stop the tack pot and clearer.

Figure 3:
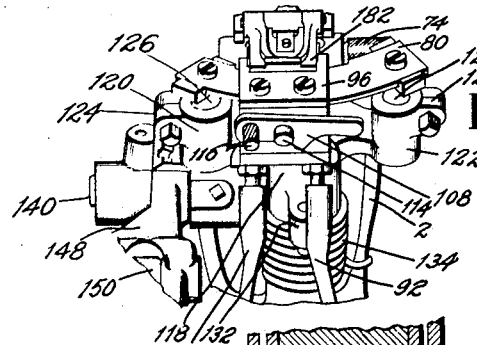
Fig. 3 is a perspective, front view of parts shown in Figs. 1 and 2.
Figure 2:
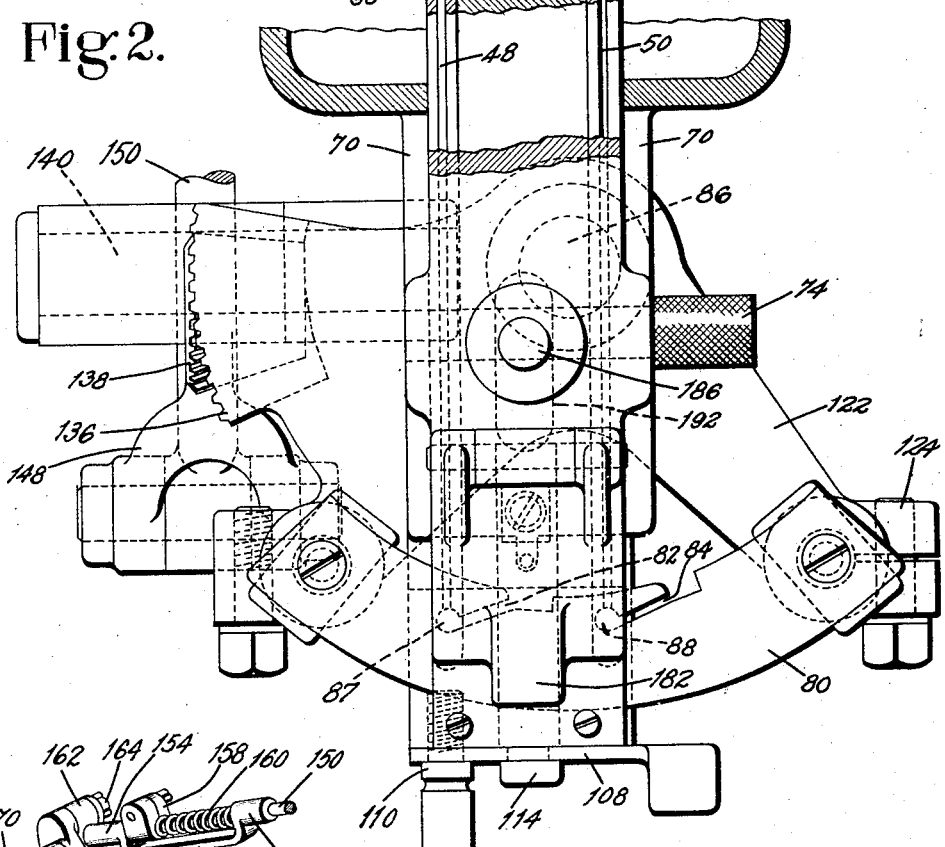
Fig. 2 is a plan view of parts shown in Fig. 1.

The raceway unit 8 comprises a spill pan 44 upon which the vanes 46 of the tack pot are continually spilling tacks as the tack pot is rotated, and a plurality of channels 48, 50 along which the tacks descend toward the clearer. A block 52 has fastened to it plates 54, 55, 56, 57, the plates 54, 55 and 56, 57 being spaced apart by filler pieces 60, 62 to form the channels 48, 50 for the tacks. The raceway unit is supported by a face 68 of the frame 2 and is held laterally in place by side walls 70 having holes 72. A pin 74 passes through the holes 72 in the walls and a hole 76 in the raceway unit, the hole being located below the points of the tacks as they travel down the raceways. The pin 74, face 68 and walls 70 hold the raceway unit in a predetermined fixed relation to the frame 2. At the lower end of the raceway is located an oscillating separating blade 80 having two separating slots 82, 84 (Fig. 2) which co-operate respectively with the two channels 48, 50 of the raceway. The separator plate is mounted for oscillation on a shaft 86 and, at the proper time in the cycle of the machine, is given a movement by mechanism to be later described, to cause the slots 82, 84 of the separator plate to pass across the ends of the raceways and separate the lowermost tacks and deliver them to passages 87, 88 which lead to tack tubes 90, 92 (Fig. 3) which carry the tacks to the tackers. The tack passages 87, 88 are formed in a block 94 forming part of the end block unit 10 of the separating mechanism. This block 94 has secured thereto a plate 96 the upper edge of which lies in a rabbet 98 formed across the ends of the raceway plates and the block 52. The plate 96 is slotted at 100, 102, the slots being formed with ledges 104 which lie in the plane of the surfaces of the tack-sustaining edges of the raceway plates 54, 55, 56, 57. The slots 100, 102 are alined with the raceway channels by a pin 105 on the raceway which engages a notch 106 in the plate 96. At the closed ends of the slots the ledges 104 are discontinued to allow separated tacks to fall downwardly through the tack passages 87, 88 which are formed as grooves in the block 94 open at one side. These grooves are closed by the filler pieces 60, 62 between the raceway plates. The block 94 has a latching plate 108 pivoted thereto at 110, the latch having a notch arranged to engage a groove 112 in the end of a stud 114 secured in the block 52. A hole 116 in the block 94 is engaged with the stud 114 and the block pushed against the end of the raceway unit, the latch 108 being then seated in the groove 112. The block is thus held to the raceway in position with the grooves 87, 88 against the filler pieces 60, 62, which close the open sides of the grooves to form closed tack passages. The block 94 is prevented from turning on the stud 114 by engagement of its lower face with the face 68 of the frame. It will be apparent that when the block 94 is removed the passages are opened up for inspection and can be easily cleared in case the tacks should clog in them.

The separator blade 80 is arranged to oscillate without any contact or sliding engagement either with the raceway unit 8, with the block 94 or its plate 96, it being supported and its path determined entirely by the shaft 86 upon which it is mounted as follows: The shaft 86 extends freely through a member 118 (Fig. 3) which has two arms 120, 122 extending radially from it. Each of the arms is provided at its end with a split clamp 124 to receive a stud 126. The ends of the separator blade 80 are secured respectively to the studs 126, 126. The studs may be adjusted vertically to locate the tack separating edge of the plate in proper vertical relation to a surface 128 on the end of the raceway unit, this surface being slightly more than the thickness of the blade 80 below the lower face of the plate 96 when the parts are in assembled relation. The blade 80 is so adjusted that it has no contact with the end block 94 or with the plate 96. The longitudinal position of the raceway is such that the inner or tack separating edge of the blade 80 is close to but out of contact with portions 130 of the ends of the raceway plates, 54, 55, 56, 57, which portions are parallel with the arc of movement of the blade. A lug 132 (Fig. 3) on the member 118 which carries the separator is yieldingly connected by a spring 134 to the frame 2, the spring being under tension so as to tend to move the separator in a direction opposite to its separating movement. The member 118 has a gear segment 136 which is engaged by a gear segment 138 mounted loosely on a stud shaft 140 held by a set-screw 142. The segment 138 has a stop arm 144 carrying an adjusting screw 146 which engages the frame 2 to limit movement of the arm and the separator. The segment 138 has an operating arm 148 pivoted to a link rod 150 which is operated by power of the machine once in each cycle to swing the separator blade once across the ends of the raceways and back to separate a tack from each raceway and allow them to drop through the passages 87, 88 into the tack tubes 90, 92.

Figure 4:
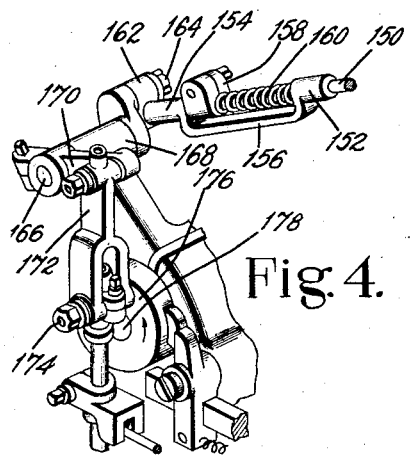
Fig. 4 is a detail in perspective of the separator-operating mechanism.

The link rod 150 is operated by mechanism shown in Fig. 4. The rod 150 passes loosely through the separated sleeves 152, 154 connected by a bar 156. On the rod 150 between the sleeves are a clamp collar 158 and a spring 160. The sleeve 154 has an ear 162 mounted on a crank pin 164 of a rock shaft 166 which is journaled in a bracket 168 of the frame and to which is secured an arm 170 connected by a link 172 to a crank pin 174 on a disk 176 on a shaft 178 which rotates once in each cycle of the machine. Rotation of the disk therefore imparts a positive push and a yielding pull to the rod 150. The positive push retracts the separator 80 assisted by the spring 134. The pull advances the separator yieldingly through the spring 160, which is stiff enough to overcome the spring 134, and separates the tacks, this movement of the separator being limited by the stop screw 146, upon engagement of which with the frame continued movement of the crank pin 164 may compress the spring 160. The separating movement is therefore controllable by the stop screw 146 to aline the openings at the ends of the slots 82, 84 with the tack passages 87, 88. All backlash in the connection is taken up by the opposed springs 134 and 160, and the tack separating movement is effected yieldingly so that if there is undue resistance to separating movement of the separator plate by reason of jamming of tacks, the spring 160 can yield without causing breakage of parts.

The third or cover unit 12 of the separating mechanism comprises a member 180 which forms the front end of the chamber 4 and covers the portion of the raceways leading from the tack chamber to the block 94. To the forward end of the member 180 is pivoted a lid 182 which may be lifted in order to inspect the lower ends of the raceways, including the slots in the plate 96, and which is held either in open or closed position by a spring 184 which engages suitably formed surfaces on the member 180. The member is held in place by a bolt 186 having a hook 188 which passes downwardly through a slot 190 in the block 52 of the raceway unit, and, by an upward sliding movement of the member 180, is caused to engage with the pin 74 which holds the raceway unit in position. The bolt 186 is provided with a thumb nut 192 by tightening which the member 180 is not only held in position, but the pin 74 is also clamped in place against accidental movement. The bolt 186 is reduced to receive a compression spring 194 which acts between the member 180 and the hook to move the hook downwardly to free it from the pin 74 when the thumb nut 192 is loosened. The extensions 42 which co-operate with the clearer fingers 40 are removably attached to the member 180 by screws 196 which extend through a retaining block 198 and the extensions into the member 180.

From the construction described it will be seen that the end block unit 10 may be removed by simply releasing the latch 108 from the stud 114 and sliding it longitudinally of the stud so that trouble with the separator or the tack passages in the block may be readily located. By loosening the thumb nut 192 the hook 188 may be disengaged from the pin 74 and the member 180 slid downwardly and outwardly and then removed upwardly to locate any trouble with the clearers or with the upper part of the raceways. In case there is trouble with the raceway unit, it is only necessary to remove the tack pot as described and then pin 74, whereupon the raceway unit may be removed by longitudinal and upward movement through the open end of the frame 2. The lid 182 may be lifted to ascertain whether tacks are flowing properly to the separator.

Having thus described our invention, what we claim as new and desire to secure by Letters Patent of the United States is:

1. A tack-handling mechanism comprising a frame, a raceway unit, and a raceway cover unit constructed and arranged to be held in predetermined position by a single pin and to be detached and separated from each other and from the frame by removal of said pin.

2. A tack-handling mechanism comprising a frame, a raceway unit, a raceway cover unit and a raceway end block unit constructed and arranged to be detached and separated from each other and from the frame without the use of tools.

3. A tack handling mechanism comprising a frame having a channel, a raceway unit seated in said channel, a raceway cover unit, a pin passing through the walls of the channel and through the raceway, and means on the cover unit engaging said pin to hold the pin in place and to hold the cover unit in position.

4. A tack-handling mechanism comprising a frame, a raceway unit mounted thereon, a pin for holding the raceway in position, a raceway cover unit, a hook carried by the cover unit to engage said pin, and means for moving the hook transversely of the pin to hold the pin and the cover in place.

5. A tack-handling mechanism comprising a frame, a raceway unit mounted thereon, a pin for holding the raceway in position, a raceway cover unit arranged to slide lengthwise of the raceway unit, a hook carried by the cover unit to engage said pin by longitudinal movement of the cover, and means for moving the hook transversely of the pin to hold the pin and the cover in place.

6. A tack-handling mechanism comprising a frame, a removable tack pot, a removable raceway unit, a removable raceway cover unit, a pin for holding the raceway unit in place on the frame, and a clamp on the cover unit to engage the pin to hold the pin and the cover unit in place.

7. A tack-handling mechanism comprising a frame, a removable tack pot, a removable raceway unit, a removable raceway cover unit, a pin for holding the raceway unit in place on the frame, means on the cover unit to engage the pin, and a clamping screw for said means to hold the pin in place and to clamp the cover unit in place.

8. A tack-handling mechanism comprising a frame, a raceway unit mounted thereon, a pin for holding the raceway in position, a raceway cover unit, and means carried by the cover arranged to prevent displacement of the pin and to hold the cover in place.

9. A tack-handling mechanism comprising a frame having a tack chamber open at one end, a tack pot arranged to close said opening, a shaft having one end fixed on the frame within said tack chamber upon which shaft the tack pot is mounted for rotation and for removal over the other end of the shaft, a raceway unit passing through said chamber with one end projecting into said tack pot and the other end seated on the frame, and a pin passing through the frame and raceway unit to hold the raceway unit in place, said unit being removable by removing the tack pot and the pin.

10. A tack-handling mechanism comprising a frame having a tack chamber open at one end, a tack pot arranged to close said opening, a stud shaft held at one end in the frame within the tack chamber and having its other end freely projecting outwardly to receive the tack pot for rotation thereon, the tack pot being removable over the free end of the shaft, a raceway unit passing through said chamber with one end portion projecting into said tack pot and the other end portion seated on the frame, and means to secure the raceway unit in place, said unit being removable by removing the tack pot and releasing said means.

11. A tack-handling mechanism comprising a raceway, a stud on the raceway, and an end block arranged to slide on said frame and on said stud into operative relation to the raceway, said block having a tack passage open at one side which side is closed by the raceway, the construction being such that upon removal of the block said tack passage is open from end to end for inspection and for removal of tacks therefrom.

12. A tack-handling mechanism comprising a frame, a separator support having a shaft mounted in bearings on the frame and having diverging arms, a separator blade attached at its ends to said arms and otherwise unsupported, a raceway arranged to slide on the frame into position with its end under said blade, means to hold the raceway in a position in operative relation to the blade and without touching the blade, and an end block for the raceway mounted in predetermined relation to the separator blade and frame and out of contact with the blade.

13. A tack-handling mechanism comprising a frame, a separator support having a shaft mounted in bearings on the frame and having diverging arms, a separator blade attached at its ends to said arms and otherwise unsupported, a raceway arranged to slide on the frame into position with its end under said blade, and means to hold the raceway in position in operative relation to the blade and without touching the blade.

14. A tack-handling mechanism comprising a frame, a curved separator, a support for said separator mounted on the frame on an axis at the center of curvature of the separator, a raceway for conducting tacks to the separator, and an end block secured to the raceway and having a passage for the separated tacks, said separator passing between the raceway and block without contact with either.

15. A tack-handling mechanism comprising a frame, a curved separator having a plurality of tack separating slots, a support for said separator mounted on the frame on an axis at the center of curvature of the separator, and a multiple raceway for conducting tacks to the separator, said separator passing across the end of the raceway without contact therewith.

16. In a tack-handling mechanism, a raceway, a curved separator arranged to turn on an axis to separate tacks from the raceway, a spring arranged to oppose tack-separating movement of the separator, operating means for the separator comprising a rod, and means for pulling yieldingly on the rod to operate the separator in opposition to said spring and for pushing positively on the rod to assist said spring in returning the separator to normal position.

17. A tack-handling mechanism comprising a raceway, a curved separator blade arranged to turn on an axis to separate tacks and having a slot with an enlarged delivery end, a tack passage into which separated tacks are dropped by the separator from the delivery end of its slot, yielding means opposing separating movement of the separator, operating means including a spring to move the separator against said yielding means, and a stop for limiting movement of the operating means, said stop being adjustable to effect alinement of the delivery end of the slot of the separator with the tack passage.

In testimony whereof we have signed our names to this specification.

GEORGE GODDU.
FRED L. MACKENZIE.